United States Patent
Heller et al.

(10) Patent No.: US 10,791,086 B2
(45) Date of Patent: Sep. 29, 2020

(54) TRANSPARENT DNS SUBTREE REDIRECTION INCLUSIVE OF SUBTREE OWNER

(71) Applicant: Cisco Technology, Inc., San Jose, CA (US)

(72) Inventors: Phillip Andrew Heller, Belmont, MA (US); Mark Michael Warren, Stoneham, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 178 days.

(21) Appl. No.: 15/811,927

(22) Filed: Nov. 14, 2017

(65) Prior Publication Data
US 2019/0149506 A1 May 16, 2019

(51) Int. Cl.
| G06F 15/16 | (2006.01) |
| H04L 29/12 | (2006.01) |
| H04L 29/06 | (2006.01) |

(52) U.S. Cl.
CPC ...... *H04L 61/1511* (2013.01); *H04L 61/2007* (2013.01); *H04L 65/1006* (2013.01); *H04L 65/403* (2013.01); *H04L 67/42* (2013.01)

(58) Field of Classification Search
CPC ............ H04L 61/1511; H04L 61/2007; H04L 65/1006
USPC ................................................. 709/245, 238
See application file for complete search history.

(56) References Cited

U.S. PATENT DOCUMENTS

| 2006/0077959 A1* | 4/2006 | Beckemeyer ..... H04L 29/12103 370/352 |
| 2010/0165072 A1* | 7/2010 | Oike .................. H04L 12/1822 348/14.09 |
| 2012/0116873 A1* | 5/2012 | Damm .................. G06Q 30/02 705/14.49 |
| 2016/0315969 A1* | 10/2016 | Goldstein ........... G06F 21/6218 |
| 2016/0380960 A1* | 12/2016 | Pandrangi ........... H04L 61/1511 709/224 |
| 2019/0081924 A1* | 3/2019 | White ................. H04L 61/2076 |

OTHER PUBLICATIONS

DNAME REdirection in the DNS W.Wijngaards (IETF) Internet Engineering Task Force (Year: 2012).*
(Continued)

*Primary Examiner* — David R Lazaro
*Assistant Examiner* — Mariegeorges A Henry
(74) *Attorney, Agent, or Firm* — Edell, Shapiro & Finnan, LLC

(57) ABSTRACT

A methodology for operating an authoritative DNS server includes receiving a DNS query from a DNS client, in response to the DNS query, traversing a label tree stored in the authoritative DNS server to find a resource record that matches the DNS query, while traversing the label tree, encountering a LINK record in the label tree that is configured to redirect the traversing to a different branch of the label tree, and in response to the LINK record, redirecting the traversing to the different branch of the label tree, wherein the LINK record is a resource record type that is hidden from DNS clients and is configured to redirect for an owner of the record type and subordinates thereof.

20 Claims, 5 Drawing Sheets

(56) References Cited

OTHER PUBLICATIONS

S. Rose, et al., "DNAME Redirection in the DNS", Internet Engineering Task Force (IETF), ISSN: 2070-1721, Jun. 2012, RFC 6672, 22 pages.
David B., "DNS: DNAME Is Useless", Dec. 4, 2006, davidb dives in—Blog, http://blacka.com/david/2006/12/04/dns-dname-is-almost-useless/, 3 pages.
DNSimple Corporation, "ALIAS Records", https://support.dnsimple.com/articles/alias-record/, downloaded Jul. 17, 2019, 3 pages.

* cited by examiner

US 10,791,086 B2

TRANSPARENT DNS SUBTREE REDIRECTION INCLUSIVE OF SUBTREE OWNER

TECHNICAL FIELD

The present disclosure relates to resolving domain name system (DNS) queries.

BACKGROUND

A domain name system (DNS) server is employed to, among other things, resolve a fully qualified domain name (FQDN) to an Internet Protocol (IP) address. For example, a client application, such as a browser, running on a host computer might receive input from a user when the user selects a link on a webpage. The link is associated with content that the user would like to access, but the content might be stored on a remote server. In order for the browser (or other application) to obtain the content from the remote server, the browser (or other application) must first obtain an IP address corresponding to the remote server. In this regard, a DNS server is configured to resolve a given FQDN, which is provided in a DNS request, and that may be received from the client application, to a corresponding IP address. The corresponding IP address is then returned to the browser from the DNS server in a DNS response.

In addition to IP addresses, a DNS server can also provide other information from a variety of different record types. Such record types include, e.g., a canonical name (CNAME) record, a DNAME record, a mail exchange (MX) record, a name server (NS) record, and a text (TXT) record, among others. As web services proliferate, managing the expanding information related to DNS queries can become challenging.

DESCRIPTION OF EXAMPLE EMBODIMENTS

Overview

A methodology is provided for operating an authoritative DNS server. The methodology includes receiving a DNS query from a DNS client, in response to the DNS query, traversing a label tree stored in, or accessible to, the authoritative DNS server to find a resource record that matches the DNS query, while traversing the label tree, encountering a LINK record in the label tree that is configured to redirect the traversing to a different branch of the label tree, and in response to the LINK record, redirecting the traversing to the different branch of the label tree, wherein the LINK record is a resource record type that is hidden from DNS clients and is configured to redirect for an owner of the record type and subordinates thereof.

In another embodiment, a device is provided. The device includes an interface unit configured to enable network communications, a memory, and one or more processors coupled to the interface unit and the memory, and configured to: receive a DNS query from a DNS client, in response to the DNS query, traverse a label tree stored in, or accessible to, the device to find a resource record that matches the DNS query, while traversing the label tree, encounter a LINK record in the label tree that is configured to redirect the traversing to a different branch of the label tree, and in response to the LINK record, redirect the traversing to the different branch of the label tree, wherein the LINK record is a resource record type that is hidden from DNS clients and is configured to redirect for an owner of the record type and subordinates thereof.

Example Embodiments

Figure 1:
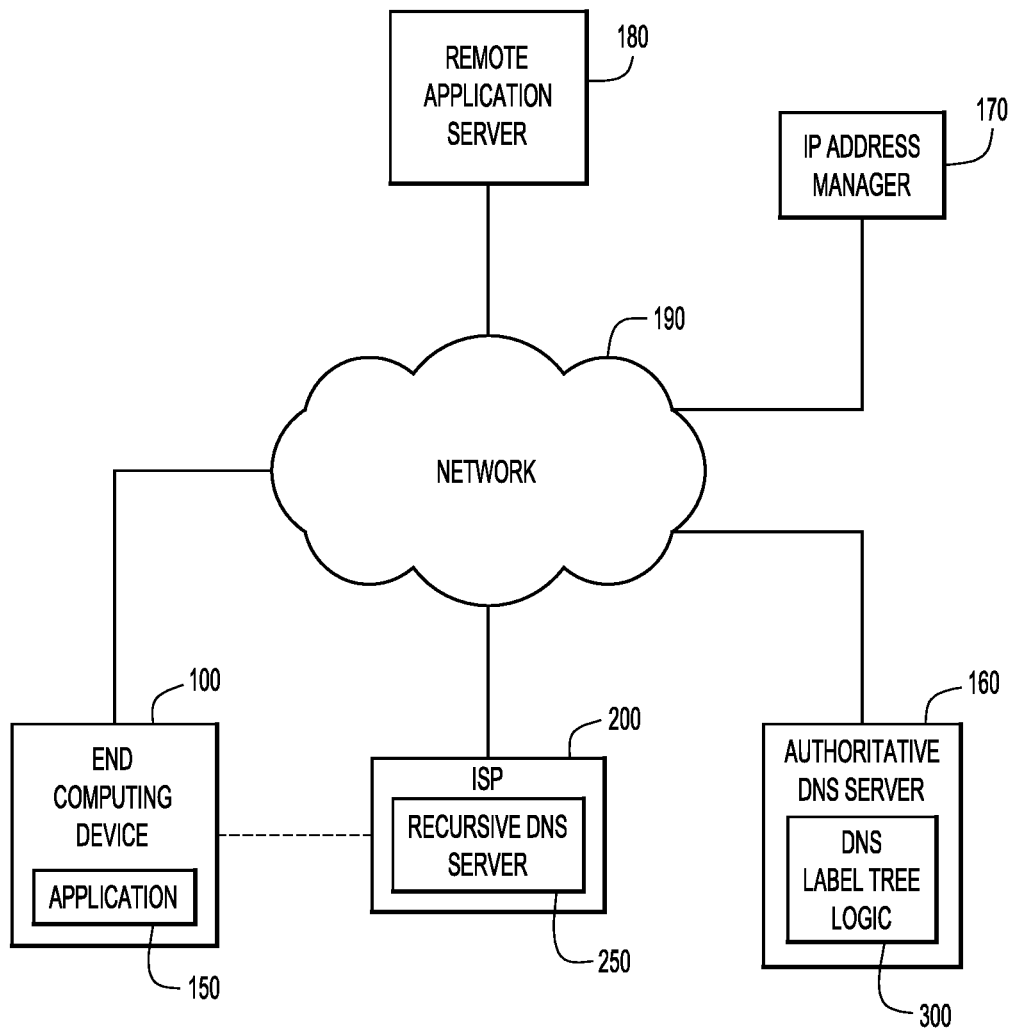
FIG. 1 depicts an electronic communications network in which DNS label tree logic hosted on a DNS server may be executed in accordance with an example embodiment.

FIG. 1 depicts an electronic communications network in which DNS label tree logic hosted on a DNS server may be executed in accordance with an example embodiment. Specifically, FIG. 1 shows an end computing device (or client) 100 such as a desktop computer, laptop, tablet, or mobile device, among others, that is configured to communicate with a network 190, such as the Internet. Application 150, running on end computing device 100, may be a web browser, or other application that is configured to obtain content or services from, e.g., a remote application server 180.

End computing device 100 may be in communication with network 190 via Internet service provider (ISP) 200 that may include a recursive DNS server 250. ISP 200 may be in communication with an authoritative DNS server 160, which hosts DNS label tree logic 300. An Internet Protocol (IP) address manager 170, or other database or data source, may be in communication with authoritative DNS server (or simply "DNS server") 160. IP address manager 170 supplies IP address lookup tables, as well as other resource records, to DNS server 160 that may be of use to application 150 running on end computing device 100.

DNS server 160 is employed to, among other things, resolve a fully qualified domain name (FQDN) for which it is authoritative to an Internet Protocol (IP) address. For example, a browser application 150 running on end computing device 100 might receive input from a user when the user selects a uniform resource locator (URL) on a webpage. The URL is associated with content or service that is desired to be accessed by the user, but the content or service might be stored on remote server 180. In order for the browser application 150 to obtain the content or service from the remote server 180, the browser 150 must first obtain an IP address of the remote server. In this regard, the browser sends a DNS request to recursive DNS server 250 seeking an IP address corresponding to the domain name of the remote server.

Recursive DNS server 250 can be viewed as an "intermediary" between the end computing device 100 and DNS server 160 that is hosting, e.g., a given company's domains and the IP addresses that are associated with a given domain name. From the perspective of DNS server 250, end computing device 100 is considered a "client," and from the perspective of DNS server 160, recursive DNS server 250 is considered a "client." Recursive DNS server 250 performs two major tasks.

First, when a user types in a URL in, e.g., browser application 150, the host portion of the URL is sent to the recursive DNS server 250. The recursive DNS server 250 preliminarily checks its cache memory to see if the IP address (or other information) for the requested host is already stored therein. If the IP address (or other information) is already in memory, then the recursive DNS server 250 will immediately provide the IP address (or other information) back to application 150 and the application 150 will be taken to the website (and/or be provided with desired resource record, i.e., other information).

Second, if the recursive DNS server 250 does not have the IP address (or other information) in memory, it will go through the process of fetching the IP address (called "recursion") and return it to the application 150. That is, the recursive DNS server 250 will recursively access DNS server 160 (and other authoritative DNS servers, to which portions of the DNS tree may be delegated) to obtain the IP address or other information sought. The recursive DNS server 250 will then store the IP address (or other information) in memory for a certain amount of time, as defined by a "Time To Live" (TTL) parameter provided along with the IP address or other information.

Some services require multiple DNS records for proper operation, and when such services are made accessible at, e.g., a "vanity" domain, the records are duplicated for that domain such that the recursive DNS server 250 will arrive at the various records by traversing the label tree and matching names, including the vanity domain name. That is, in addition to necessary DNS records subordinate to the vanity domain, it is common to make the service accessible by an application (e.g., a browser) at the vanity domain itself. For example, if the vanity domain is "customer.company.com", a client web browser wishes to reach the service with a URL hostname component of "customer.company.com". Given that there may be hundreds or even thousands of "customer" names (and the requisite subordinate records for each), the number of duplicated DNS resource records (RRs) can quickly become unwieldly.

To address this problem, embodiments described herein, provide increased scalability and decreased provisioning time by adopting a unique pointer in the domain name system such that queries for the vanity domain itself and subordinate records of the vanity domain are redirected to a set of existing records elsewhere in the domain name system. The unique pointer is hereinafter referred to as a "redirection record" or "LINK record" (i.e., a record type that "links" to another part of a label tree) the details of which are explained below, and partially in connection with the DNAME record type and CNAME record type.

Specifically, RFC6672 describes the DNAME record type. While a DNAME record for a given vanity domain can satisfy scalability concerns and mitigate the need to create a full set of subordinate records necessary to enable services for that vanity domain, the handling of the DNAME record owner presents a specific challenge. Web services such as the one available at the vanity domain itself are commonly made highly available by delegating their owner name to a global server load balancer (GSLB) by way of a name server (NS) record. The GSLB returns an answer containing the address of a healthy server appropriate for the client. The existence of this NS record for the vanity domain owner precludes the existence of any other record type for that owner, however. An alternative method is to use a CNAME record to alias one record to another, where the latter has an NS record to accomplish the aforementioned delegation. A CNAME record cannot coexist with a DNAME record per the DNAME specification, however.

Ultimately, the problem to solve is how to achieve the scalability made possible by the DNAME record while maintaining high availability of the geographically distributed web service offered at the vanity domain where the very DNAME record would be configured.

In order to provide the desired functionality, the unique LINK record is implemented.

The LINK record type is similar to the existing DNAME record type, but differs in two significant ways:

1. The LINK record type is hidden from DNS clients. The subtree redirection and resolution occurs entirely within the DNS server (e.g., DNS server 160) that is authoritative for the name; and 2. The LINK record type redirects for the record owner as well as its subordinates, whereas, as noted, the DNAME record type will only redirect for subordinates.

To support the forecasted volume and expedient provisioning of customers for services such as video conferencing (e.g., the Webex service offered by Cisco Systems, Inc.), where each customer has a vanity domain name and the necessary ancillary records, a new DNS system may be implemented. Though the standard DNS record types can provide the necessary functionality to enable the service, they do so in a manner that is more resource intensive, more difficult to scale, and slower to provision. The LINK record type is unique in that it enables a use case not anticipated by existing DNS record types and it does so in a manner that is resource efficient and thus scalable and quick to both provision and maintain.

Figure 2:
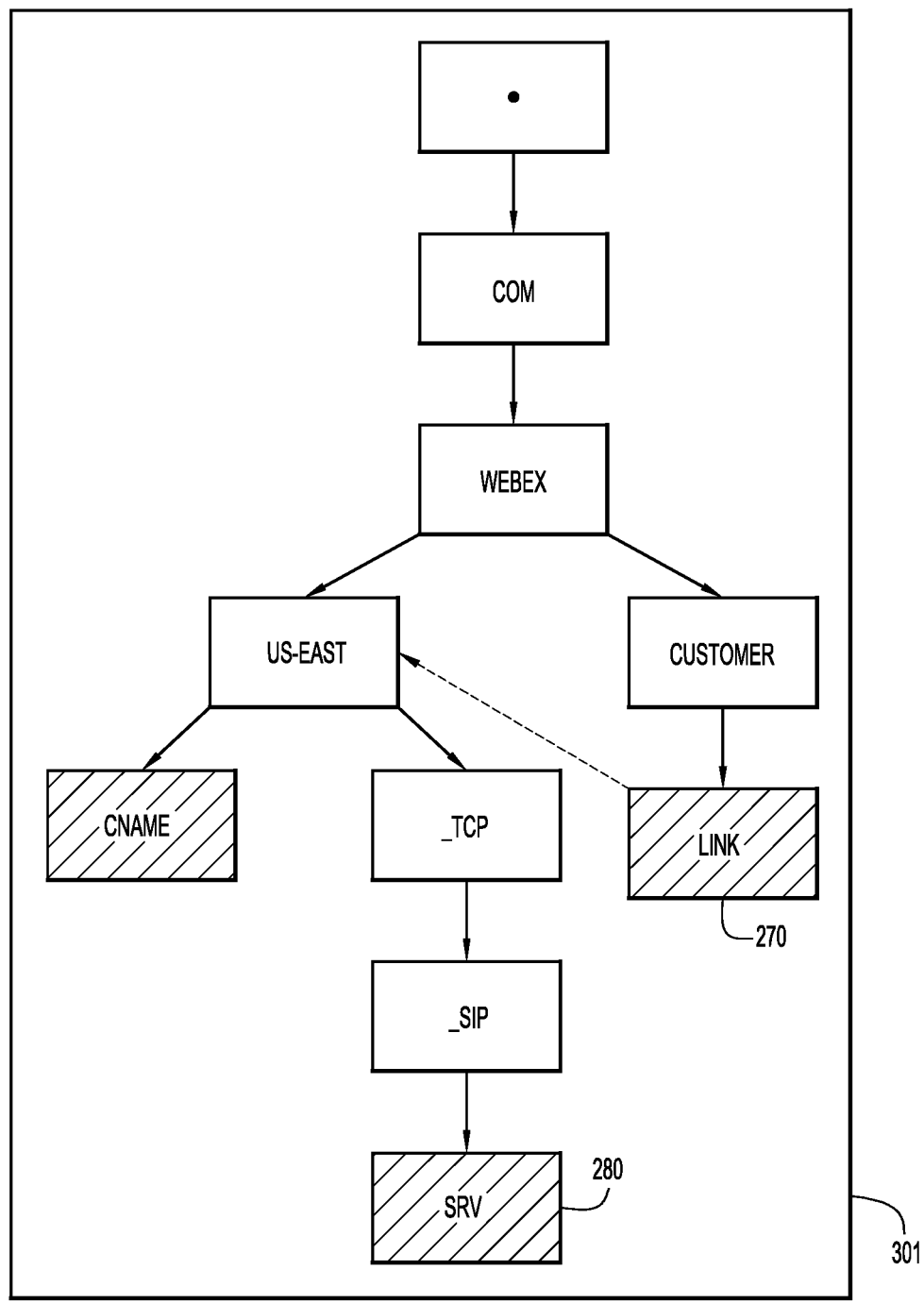
FIG. 2 depicts a label tree in which a LINK record is employed to achieve a desired redirection in connection with recursive look up or matching in a DNS label tree in accordance with an example embodiment.

FIG. 2 depicts a label tree in which a LINK record is employed to achieve a desired redirection in connection with recursive look up or matching in a DNS label tree in accordance with an example embodiment. The label tree 301 depicted in FIG. 2 is an example of data that might be stored in memory accessible to DNS label tree logic 300 depicted in FIG. 1.

Specifically, FIG. 2 shows a label tree 301 that supports resource records that might be of use in connection with setting up and executing, e.g., a Webex video conference. That is, when a user at end computing device 100 runs, e.g., a browser to establish a Webex session, the browser and/or other application 150 needs information, configuration settings, data, etc. to enable the application 150 to communicate with one or more remote application servers 180. Such information can be obtained from authoritative DNS server 160, which will traverse the label tree of FIG. 2 and obtain data from matching nodes in response to a query from recursive DNS server 250. In the example shown, information in SRV record 280 would be used to establish a Session Initiation Protocol (SIP) connection for the videoconference. It is not unusual for the information in the SRV record 280 (and potentially other records) to be the same regardless of who a given customer might be. That is, an application 150 that is seeking to establish a WebEx video conference for customer1.webex.com would likely need the same SIP information stored in SRV record 280 as an application 150 seeking to establish a WebEx video conference for customer2.webex.com. Thus, in order to avoid duplication, the SRV record 280 (and potentially other records), in accordance with the presently described embodiments, is used by multiple customers. This re-use is made possible by LINK record 270. In this particular example, a LINK record 270 might have the form:
  customer1.webex.com. IN LINK_us-east.webex.com.
  customer2.webex.com. IN LINK us-east.webex.com.

Referring still to FIG. 2, as authoritative DNS Server 160 traverses the label tree 301, it will encounter, for different customers (e.g., customer1, customer2, etc.), a same LINK record 270 that points to, in this case, a node "us-east," which has subordinate nodes _tcp, _sip, with the data present at the _sip node, the SRV record, being the desired target for application 150 (and by proxy, for recursive DNS server 250).

By using LINK record 270, it is not necessary to duplicate for each customer the same resource records. So, for instance, where perhaps 10-15 individual resource records might be needed to support a given application, e.g., WebEx video conference, a potential 10-fold memory savings might be realized, along with an associated reduction in management resources.

Practically speaking, and in accordance with the instant embodiments, an application 150 issues a DNS query to recursive DNS server 250 for an A (i.e., IP address) or CNAME record for customer.webex.com and, in response, the recursive DNS server 250 queries link record-capable authoritative DNS server 160. Authoritative DNS server 160 finds the sought after name, discovers and follows LINK record 270 and repeats the lookup for the requested record type at a target of the LINK record, namely us-east, in the example of FIG. 2.

For names subordinate to the original query (i.e., _sip._tcp.customer.webex.com) authoritative DNS server 160 continues the lookup at the target of the LINK record, again us-east in this case. Authoritative DNS server 160 then rewrites response content to match the queried name.

This functionality is different from a DNAME resource record.

According to section 2.3 of the DNAME RFC 6672: "Unlike a CNAME RR, a DNAME RR redirects DNS names subordinate to its owner name; the owner name of a DNAME is not redirected itself. The domain name that owns a DNAME record is allowed to have other resource record types at that domain name, except DNAMEs, CNAMEs, or other types that have restrictions on what they can coexist with."

In the case of supplying resource records for vanity domains, a CNAME record at the same owner is used to redirect web clients for many vanity domains to a specific deployment of the web application (e.g., videoconferencing). The use of a CNAME record for this purpose allows for further delegation and resolution by a global server load balancing appliance.

The absence of this functionality (as would be the case with the DNAME record) would require that for each customer, a CNAME record would need to be created for the vanity domain itself, and, in the case of a videoconferencing application such as Webex, approximately 10 SRV records subordinate to the vanity domain. This amount of duplication can quickly become unmanageable, particularly with respect to time needed to provision new vanity domains and disseminate that information to DNS infrastructure.

Figure 3:
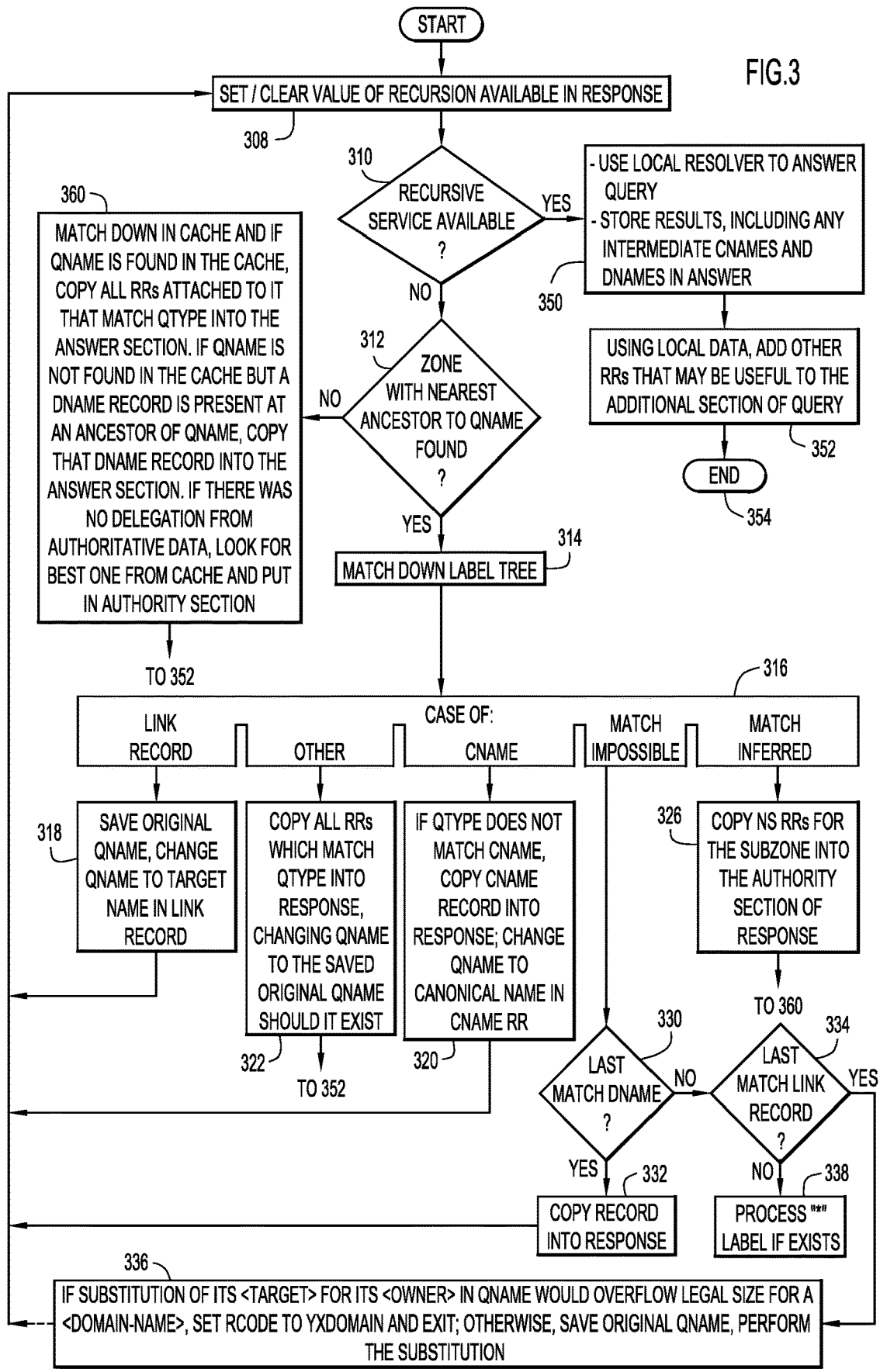
FIG. 3 depicts a flow chart of a series steps for recursive look up or matching in a DNS label tree in accordance with an example embodiment.

FIG. 3 depicts a flow chart of a series steps for look up or matching in a DNS label tree in accordance with an example embodiment. The flow depicted follows the flow described in RFC 6672, but modified to include the functionality of the LINK record described herein. In accordance with an embodiment, the series of steps may be performed by DNS label tree logic 300 acting on, e.g., label tree 301, which might be stored in memory accessible to DNS label tree logic 300.

At 308, the logic 300 sets or clears the value of recursion available in the response depending on whether the name server is willing to provide recursive service. At 310, if recursive service is available and requested via the RD bit in the query, then logic 300 proceeds to operation 350 at which the local resolver or a copy thereof is used to answer the query. The results are stored, including any intermediate CNAMEs and DNAMEs, in the answer section of the response.

Then, at 352, logic 300, using local data, adds other RRs that may be useful to the additional section of the query.

If at 310, recursive service is not available, then logic 300 proceeds to 312 to search the available zones for a zone which is the nearest ancestor to the query name (QNAME). If such a zone is found, then logic 300 proceeds to 314. If not, process 300 proceeds to 360. At 360 process 300 matches down in (traverses) the cache. If the query name (QNAME) is found in the cache, process 300 copies all resource records (RRs) attached to the node that match the query type (QTYPE) into the answer section. If QNAME is not found in the cache but a DNAME record is present at an ancestor of QNAME, process 300 copies that DNAME record into the answer section. If there was no delegation from authoritative data, a best one from the cache is put in the authority section of the response. Process 300 then proceeds to 352.

Again, if such a zone is found at 312, logic 300 proceed to 314 at which logic 300 matches down the label tree, label by label in the zone. The match can terminate in one of several ways as indicated by case statement 316.

In the event the whole QNAME is matched and the data at the node is a link record according to the instant embodiments, then at 318 logic 300 saves the original QNAME, changes QNAME to the target name in the link record, and returns to 308. Note that the LINK record is not copied into the answer section of the response.

If the data at the node is a CNAME, then at 320 logic 300 operates such that when the QTYPE does not match CNAME, logic 300 copies the CNAME RR into the answer section of the response, changes the QNAME to the canonical name in the CNAME RR, and returns to 308.

If the matched label is other than a LINK record or CNAME, then at 322 process 300 copies all RRs which match the QTYPE into the answer section, and changes the QNAME to the saved original QNAME should it exist, and proceeds to 352.

If a match would cause a movement out of the authoritative data, a referral is indicated. This can occur when traversing the label tree encounters a node with NS RRs marking cuts along the bottom of a zone. As such, at 326, process 300 copies the NS RRs for the sub-zone into the authority section of the reply or response, places whatever addresses are available into the additional section, using glue RRs if the addresses are not available from authoritative data or the cache, and proceeds to 360.

If, at some label, a match is impossible (i.e., the corresponding label does not exist), then at 330 process 300 determines whether the last label matched has a DNAME. If yes, at 332, process 300 copies that record into the answer section. If substitution of its <target> for its <owner> in QNAME would overflow a legal size for a <domain-name>, process 300 sets RCODE to YXDOMAIN (according to RFC 2136) and exits. Otherwise, process 300 performs the substitution. The server MUST synthesize a CNAME record and include it in the answer section. Process 300 returns to 308.

If the last match was not a DNAME, then at 334 process 300 determines whether the last match was a LINK record. If a LINK record exists at that point then at 336, if substitution of its <target> for its <owner> in QNAME would overflow a legal size for a <domain-name>, process 300 sets RCODE to YXDOMAIN (according to RFC 2136) and exits. Otherwise, process 300 saves the original QNAME, performs the substitution and returns to 308.

If there was no DNAME or LINK record per operations 330 and 334, then at 338 process 300 processes a "*" label, if it exists. Specifically, if the "*" label does not exist, process 300 checks whether the name being looked up is the original QNAME in the query or a name followed due to a CNAME, DNAME, or LINK record. If the name is original or was arrived at by a LINK record, process 300 sets an authoritative name error in the response and exit. Otherwise, process 300 exits.

If the "*" label does exist and the data at the node is a LINK record, then if substitution of its <target> for its <owner> in QNAME would overflow a legal size for a <domain-name>, process 300 sets RCODE to YXDOMAIN (according to RFC 2136) and exits. Otherwise, process 300 saves the original QNAME, performs the substitution and returns to 308.

If the "*" label does exist, process 300 matches RRs at that node against QTYPE. If there is any match, process 300 copies them into the answer section, but sets the owner of the RR to be QNAME, and not the node with the "*" label. If the data at the node with the "*" label is a CNAME, and QTYPE does not match CNAME, process 300 copies the CNAME RR into the answer section of the response changing the owner name to the QNAME, changes QNAME to the canonical name in the CNAME RR, and returns to 308. Otherwise, process 300 proceeds to 352

Figure 4:
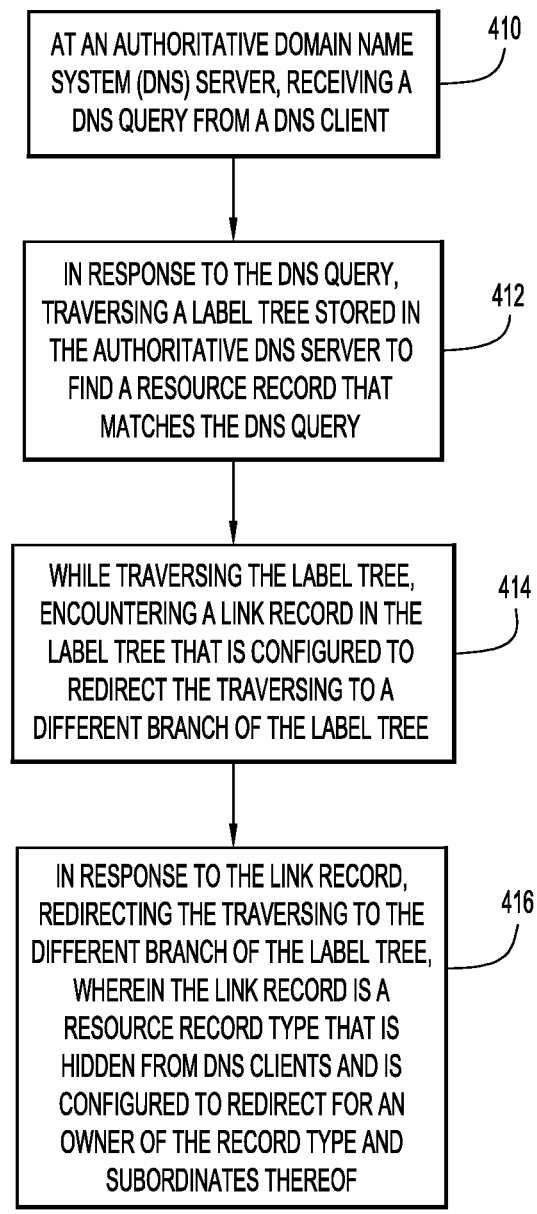
FIG. 4 depicts another flow chart of a series steps for recursive look up or matching in a DNS label tree in accordance with an example embodiment.

FIG. 4 depicts another flow chart of a series of steps for recursive look up or matching in a DNS label tree in accordance with an example embodiment. As shown, and at a higher level than that shown in FIG. 3, process logic 300 operating on an authoritative domain name system (DNS) server, may be configured to, at 410, receive a DNS query from a DNS client. At 412, logic 300 may, in response to the DNS query, traverse a label tree stored in the authoritative DNS server to find a resource record that matches the DNS query. At 414, logic 300 may, while traversing the label tree, encounter a LINK record in the label tree that is configured to redirect the traversing to a different branch of the label tree, and in response to the LINK record, redirect the traversing to the different branch of the label tree, wherein the LINK record is a resource record type that is hidden from DNS clients and is configured to redirect for an owner of the record type and subordinates thereof. In the end, the DNS server provides a DNS response to the DNS client.

Figure 5:
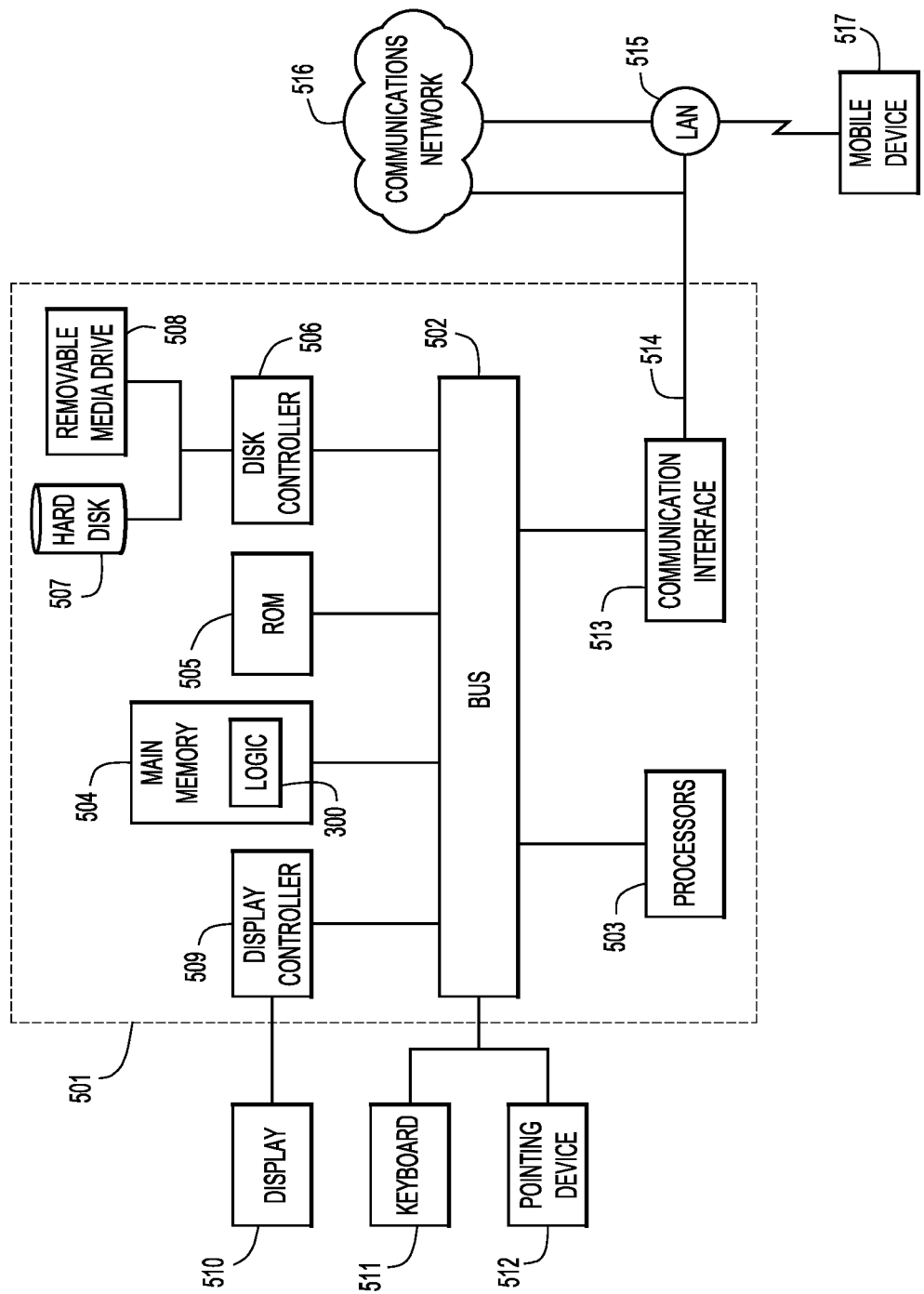
FIG. 5 is a block diagram of a device (e.g., a DNS server) on which DNS label tree logic may be implemented.

FIG. 5 is a block diagram of a device (e.g., a DNS server) on which label tree logic 300 may be implemented. The apparatus may be implemented on or as a computer system 501. The computer system 501 may be programmed to implement a computer based device. The computer system 501 includes a bus 502 or other communication mechanism for communicating information, and a processor 503 coupled with the bus 502 for processing the information. While the figure shows a single block 503 for a processor, it should be understood that the processor 503 represents a plurality of processors or processing cores, each of which can perform separate processing. The computer system 501 may also include a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions (e.g., the logic 300) to be executed by processor 503. In addition, the main memory 504 may be used for storing temporary variables or other intermediate information during the execution of instructions by the processor 503.

The computer system 501 may further include a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 may also include a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT) or liquid crystal display (LCD), light emitting diode (LED) display, for displaying information to a computer user. The computer system 501 may include input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510.

The computer system 501 performs a portion or all of the processing operations of the embodiments described herein in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the described embodiments, and for enabling the computer system 501 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including, but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516. For example, the communication interface 513 may be a wired or wireless network interface card or modem (e.g., with SIM card) configured to attach to any packet switched (wired or wireless) LAN or WWAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection to a mobile device 517 such as a personal digital assistant (PDA) laptop computer, cellular telephone, or modem and SIM card integrated with a given device.

In sum, there is provided a methodology including operations performed at an authoritative domain name system (DNS) server including receiving a DNS query from a DNS client, in response to the DNS query, traversing a label tree stored in the authoritative DNS server to find a resource record that matches the DNS query, while traversing the label tree, encountering a LINK record in the label tree that is configured to redirect the traversing to a different branch of the label tree, and in response to the LINK record, redirecting the traversing to the different branch of the label tree, wherein the link record is a resource record type that is hidden from DNS clients and is configured to redirect for an owner of the record type and subordinates thereof.

The methodology may further comprise receiving at the authoritative DNS server Internet Protocol (IP) addresses and resource records to populate the label tree.

In an embodiment, the LINK record is used to redirect the traversing to a resource record that supports a video conference application.

In one implementation, the resource record is at least one of a service (SRV) record or a CNAME record and the SRV record comprises information to establish Session Initiation Protocol (SIP) connectivity between a client and a remote server. In the label tree, the LINK record is owned by a domain name that is sought after in the DNS query.

The methodology still further includes upon encountering the LINK record in the label tree, saving a query name (QNAME) in the DNS request, and changing, in the DNS request, the QNAME to a target name indicated in the LINK record.

Notably, the LINK record operates differently from a DNAME record type, which redirects only for subordinates.

The methodology further includes returning to the DNS server a response to the DNS query.

There is further provided a device that includes an interface unit configured to enable network communications, a memory, and one or more processors coupled to the interface unit and the memory, and configured to: receive a DNS query from a DNS client, in response to the DNS query, traverse a label tree stored in the device to find a resource record that matches the DNS query, while traversing the label tree, encounter a LINK record in the label tree that is configured to redirect the traversing to a different branch of the label tree, and in response to the LINK record, redirect the traversing to the different branch of the label tree, wherein the LINK record is a resource record type that is hidden from DNS clients and is configured to redirect for an owner of the record type and subordinates thereof.

The one or more processors are further configured to receive at the authoritative DNS server Internet Protocol (IP) addresses and resource records to populate the label tree.

The LINK record is used to redirect the traversing to a resource record that supports, e.g., a video conference application.

In one implementation, the resource record is at least one of a service (SRV) record or a CNAME record, and the SRV record comprises information to establish Session Initiation Protocol (SIP) connectivity between a client and a remote server.

In an embodiment, in the label tree, the LINK record is owned by a domain name that is sought after in the DNS query. Upon encountering the LINK record in the label tree, the processors are configured to save a query name (QNAME) in the DNS request, and change, in the DNS request, the QNAME to a target name indicated in the LINK record.

Notably, the LINK record operates differently from a DNAME record type, which redirects only for subordinates In another implementation, there is provided one or more non-transitory computer readable storage media encoded with software comprising computer executable instructions and when the software is executed is operable to: receive a DNS query from a DNS client, in response to the DNS query, traverse a label tree stored in an authoritative DNS server to find a resource record that matches the DNS query, while traversing the label tree, encounter a LINK record in the label tree that is configured to redirect the traversing to a different branch of the label tree, and in response to the LINK record, redirect the traversing to the different branch of the label tree, wherein the LINK record is a resource record type that is hidden from DNS clients and is configured to redirect for an owner of the record type and subordinates thereof.

In the label tree, the LINK record is owned by a domain name that is sought after in the DNS query, and the LINK record operates differently from a DNAME record type, which redirects only for subordinates.

The above description is intended by way of example only. Various modifications and structural changes may be made therein without departing from the scope of the concepts described herein and within the scope and range of equivalents of the claims.

What is claimed is:

1. A method comprising:
   at an authoritative domain name system (DNS) server, receiving a DNS query from a DNS client;
   in response to the DNS query, traversing a label tree stored in the authoritative DNS server to find a resource record that matches the DNS query;
   while traversing the label tree, encountering a LINK record in the label tree that is configured to redirect the traversing to a different branch of the label tree; and
   in response to encountering the LINK record, redirecting the traversing to the different branch of the label tree to obtain a resource record that is returned to the DNS client to enable the DNS client to execute an application associated with the DNS query,
   wherein the LINK record is a resource record type that is hidden from DNS clients and is configured to redirect, to another resource record within the label tree, for an owner of the record type and subordinates thereof.

2. The method of claim 1, further comprising receiving, at the authoritative DNS server Internet Protocol (IP) addresses and resource records to populate the label tree.

3. The method of claim 1, wherein the LINK record is used to redirect the traversing to a resource record that supports a video conference application.

4. The method of claim 3, wherein the resource record is at least one of a service (SRV) record or a CNAME record.

5. The method of claim 4, wherein the SRV record comprises information to establish Session Initiation Protocol (SIP) connectivity between a client and a remote server.

6. The method of claim 1, wherein, in the label tree, the LINK record is owned by a domain name that is sought after in the DNS query.

7. The method of claim 1, further comprising upon encountering the LINK record in the label tree, saving a query name (QNAME) in the DNS request, and changing, in the DNS request, the QNAME to a target name indicated in the LINK record.

8. The method of claim 1, wherein the LINK record operates differently from a DNAME record type, which redirects only for subordinates.

9. The method of claim 1, further comprising returning to the DNS client a response to the DNS query.

10. The method of claim 1, further comprising identifying a zone with a nearest ancestor of a query name in the DNS request.

11. A device comprising:
    an interface unit configured to enable network communications;
    a memory; and
    one or more processors coupled to the interface unit and the memory, and configured to:
      receive a DNS query from a DNS client;
      in response to the DNS query, traverse a label tree stored in the device to find a resource record that matches the DNS query;
      while traversing the label tree, encounter a LINK record in the label tree that is configured to redirect the traversing to a different branch of the label tree; and
      in response to encountering the LINK record, redirect the traversing to the different branch of the label tree to obtain a resource record that is returned to the DNS client to enable the DNS client to execute an application associated with the DNS query,
      wherein the LINK record is a resource record type that is hidden from DNS clients and is configured to redirect, to another resource record within the label tree, for an owner of the record type and subordinates thereof.

12. The device of claim 11, wherein the one or more processors are further configured to receive at the authoritative DNS server Internet Protocol (IP) addresses and resource records to populate the label tree.

13. The device of claim 11, wherein the LINK record is used to redirect the traversing to a resource record that supports a video conference application.

14. The device of claim 13, wherein the resource record is at least one of a service (SRV) record or a CNAME record.

15. The device of claim 14, wherein the SRV record comprises information to establish Session initiation Protocol (SIP) connectivity between a client and a remote server.

16. The device of claim 11, wherein, in the label tree, the link record is subordinate owned by a domain name that is sought after in a to a vanity customer name of the DNS query.

17. The method of claim 11, wherein the LINK record operates differently from a DNAME record type, which redirects only for subordinates.

18. One or more non-transitory computer readable storage media encoded with software comprising computer executable instructions and when the software is executed is operable to:
    receive a DNS query from a DNS client;
    in response to the DNS query, traverse a label tree stored in an authoritative DNS server to find a resource record that matches the DNS query;
    while traversing the label tree, encounter a LINK record in the label tree that is configured to redirect the traversing to a different branch of the label tree; and
    in response to encountering the LINK record, redirect the traversing to the different branch of the label tree to obtain a resource record that is returned to the DNS client to enable the DNS client to execute an application associated with the DNS query, wherein the LINK record is a resource record type that is hidden from DNS clients and is configured to redirect, to another resource record within the label tree, for an owner of the record type and subordinates thereof.

19. The non-transitory computer readable storage media of claim 18, wherein, in the label tree, the LINK record is owned by a domain name that is sought after in the DNS query.

20. The non-transitory computer readable storage media of claim 18, wherein the LINK record operates differently from a DNAME record type, which redirects only for subordinates.

* * * * *

UNITED STATES PATENT AND TRADEMARK OFFICE
CERTIFICATE OF CORRECTION

PATENT NO.        : 10,791,086 B2
APPLICATION NO.   : 15/811927
DATED             : September 29, 2020
INVENTOR(S)       : Phillip Andrew Heller et al.

Page 1 of 1

It is certified that error appears in the above-identified patent and that said Letters Patent is hereby corrected as shown below:

In the Claims

Claim 2, Column 11, Line 52, please replace "comprising receiving, at" with --comprising receiving at--

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*